US009675871B1

(12) United States Patent
Jetter et al.

(10) Patent No.: US 9,675,871 B1
(45) Date of Patent: Jun. 13, 2017

(54) PC TRANSCEIVER AND METHOD OF USING THE SAME

(71) Applicant: Astro Gaming, Inc., San Francisco, CA (US)

(72) Inventors: Robert Jetter, Pleasanton, CA (US); Lars Gilstrom, Berkeley, CA (US); Kyle Hutchens, San Francisco, CA (US)

(73) Assignee: AG Acquisition Corporation, San Francisco, CA (US)

( * ) Notice: Subject to any disclaimer, the term of this patent is extended or adjusted under 35 U.S.C. 154(b) by 521 days.

(21) Appl. No.: 13/834,308

(22) Filed: Mar. 15, 2013

(51) Int. Cl.
*H04B 7/00* (2006.01)
*A63F 13/00* (2014.01)

(52) U.S. Cl.
CPC .................................... *A63F 13/00* (2013.01)

(58) Field of Classification Search
CPC ......................... A63F 13/02; A63F 2300/6063
USPC ........................................ 463/35, 40, 42, 47
See application file for complete search history.

(56) References Cited

U.S. PATENT DOCUMENTS

| | | | |
|---|---|---|---|
| 1,127,161 A | 2/1915 | Baldwin | 381/379 |
| 2,782,423 A | 2/1957 | Eli et al. | 2/209 |
| 4,270,025 A | 5/1981 | Alsup et al. | 179/15.55 R |
| 4,302,635 A | 11/1981 | Jacobsen et al. | 381/371 |
| 4,472,607 A | 9/1984 | Houng | 181/18 |
| 4,554,993 A | 11/1985 | Houng | 181/130 |
| 4,588,868 A | 5/1986 | Bertagna et al. | 381/382 |
| 4,829,571 A | 5/1989 | Kakiuchi et al. | 381/309 |
| 4,965,836 A | 10/1990 | Andre et al. | 381/370 |

(Continued)

FOREIGN PATENT DOCUMENTS

| | | |
|---|---|---|
| EP | 1638364 | 3/2006 |
| WO | WO 03/103255 | 12/2003 |

OTHER PUBLICATIONS

"Zehn Kopfhorer-Mikrofon-Sets im Vergleich," Computer Bild, Oct. 17, 2007 [retrieved on Mar. 2, 2009], pp. 2-12, http://www.computerbild.de/artikel/cbs-Tests-Hardware-Zehn-Kopfhoerer-Mikrofon-Sets-im-Vergleich-1873070.html.

(Continued)

*Primary Examiner* — Michael Cuff
(74) *Attorney, Agent, or Firm* — TraskBritt

(57) ABSTRACT

Methods and systems for providing multiple audio streams, such as a game audio stream and network chat audio stream, to a headset of a user of a gaming device are described. An exemplary system may include a gaming device having a port and that is adapted to transmit game audio and network chat to a transceiver inserted into the port thereof. The transceiver may be configured to receive local user chat. The system may also include a transceiver inserted into the port of the gaming device, the transceiver adapted to receive the game audio and the network chat transmitted from the gaming device, transmit the received game audio and network chat to a wireless headset, receive local user chat from the wireless headset, and transmit the received local user chat to the gaming device. In certain embodiments, the system may include at least one wireless headset wirelessly connected to the transceiver, the headset including a microphone and being adapted to receive the game audio and network chat from the transceiver, receive local user chat from the microphone, and transmit the local user chat wirelessly to the transceiver.

20 Claims, 3 Drawing Sheets

(56) References Cited

U.S. PATENT DOCUMENTS

| | | | | |
|---|---|---|---|---|
| 5,018,599 | A | 5/1991 | Dohl et al. | 181/129 |
| 5,035,005 | A | 7/1991 | Hung | 2/209 |
| 5,579,430 | A | 11/1996 | Grill et al. | 395/2.12 |
| 5,685,775 | A | 11/1997 | Bakoglu et al. | 463/41 |
| 5,793,878 | A | 8/1998 | Chang | 381/370 |
| 6,016,347 | A | 1/2000 | Magnasco et al. | 379/430 |
| 6,069,964 | A | 5/2000 | Yang | 381/374 |
| 6,097,809 | A | 8/2000 | Lucey et al. | 379/430 |
| 6,183,367 | B1 | 2/2001 | Kaji et al. | 463/42 |
| 6,241,612 | B1 | 6/2001 | Heredia | 463/42 |
| 6,295,366 | B1 | 9/2001 | Haller et al. | 381/374 |
| 6,466,681 | B1 | 10/2002 | Siska, Jr. et al. | 381/372 |
| 6,599,194 | B1 | 7/2003 | Smith et al. | 463/30 |
| 6,618,714 | B1 | 9/2003 | Abrahams | 706/45 |
| 6,658,130 | B2 | 12/2003 | Huang | 381/384 |
| 6,731,771 | B2 | 5/2004 | Cottrell | 381/371 |
| 6,775,390 | B1 | 8/2004 | Schmidt et al. | 381/371 |
| 6,868,164 | B2 | 3/2005 | Ito et al. | 381/370 |
| 7,082,393 | B2 | 7/2006 | Lahr | 704/233 |
| 7,090,582 | B2 | 8/2006 | Danieli et al. | 463/35 |
| 7,181,037 | B2 | 2/2007 | Birch | 381/375 |
| 7,371,175 | B2 | 5/2008 | Gilboy et al. | 463/35 |
| 7,458,894 | B2 | 12/2008 | Danieli et al. | 463/42 |
| 8,491,386 | B2 | 7/2013 | Reiss et al. | |
| 8,571,695 | B2* | 10/2013 | Reiss et al. | 700/94 |
| 8,602,892 | B1* | 12/2013 | Reiss et al. | 463/35 |
| 2002/0110246 | A1 | 8/2002 | Gosior et al. | 381/2 |
| 2002/0131616 | A1 | 9/2002 | Bronnikov et al. | 381/370 |
| 2002/0152348 | A1* | 10/2002 | Scales | G06F 13/426 710/313 |
| 2002/0196960 | A1 | 12/2002 | Pham et al. | 381/375 |
| 2004/0132509 | A1 | 7/2004 | Glezerman | 455/575.2 |
| 2004/0213427 | A1 | 10/2004 | Yoon | 381/370 |
| 2005/0003892 | A1 | 1/2005 | Cheng et al. | 463/35 |
| 2005/0007500 | A1 | 1/2005 | Lin et al. | 348/790 |
| 2005/0181872 | A1 | 8/2005 | Acharya et al. | 463/35 |
| 2005/0181878 | A1* | 8/2005 | Danieli et al. | 463/42 |
| 2006/0062417 | A1 | 3/2006 | Tachikawa | 381/378 |
| 2006/0084504 | A1 | 4/2006 | Chan et al. | 463/39 |
| 2006/0122529 | A1* | 6/2006 | Tsau | A61B 5/04004 600/544 |
| 2006/0132822 | A1* | 6/2006 | Walmsley | G06F 12/1408 358/1.14 |
| 2006/0256992 | A1 | 11/2006 | Liao | 381/371 |
| 2007/0064969 | A1 | 3/2007 | Chou | 381/381 |
| 2007/0093279 | A1 | 4/2007 | Janik | 455/569.1 |
| 2007/0183616 | A1 | 8/2007 | Wahl et al. | 381/370 |
| 2007/0214276 | A1* | 9/2007 | Panabaker | G06F 13/105 709/230 |
| 2007/0261153 | A1 | 11/2007 | Wise et al. | 2/423 |
| 2008/0152160 | A1 | 6/2008 | Chew et al. | 381/71.6 |
| 2008/0165989 | A1* | 7/2008 | Seil et al. | 381/119 |
| 2008/0311986 | A1* | 12/2008 | Reiss et al. | 463/35 |
| 2009/0252355 | A1 | 10/2009 | Mao | 381/309 |
| 2010/0040240 | A1* | 2/2010 | Bonanno | 381/74 |
| 2010/0285750 | A1* | 11/2010 | Simonelic | 455/41.3 |
| 2014/0073429 | A1* | 3/2014 | Meneses et al. | 463/35 |

OTHER PUBLICATIONS

International Search Report for Application Serial No. PCT/US2008/087280, dated Jul. 15, 2009.

International Search Report and Written Opinion for Application Serial No. PCT/US2010/058629, dated Jan. 28, 2011, 8 pp.

Fibush, David K., "Integrating Digital Audio Into the Serial Digital Video Signal," SMPTE Journal, pp. 574-579, Sep. 1994.

Press Release, "Xbox Turns Up the Volume on the Future of Video Games" [online], May 20, 2001 [retrieved on Apr. 8, 2010], 2 pp., Retrieved From the Internet: http://www.microsoft.com/presspass/press/2002/may02/05-20e3brie . . . .

Turtle Beach, "New Gaming Headphones Provide Amplification of Game Audio and Xbox Live Chat" [online], Oct. 8, 2006 [retrieved on Apr. 8, 2010], 1 p., Retrieved From the Internet: http://www.turtlebeach.com/releases/20061008/Ear-Force-X1-Xbo . . . .

Turtle Beach, "First Wireless Headphone for Xbox 360 with Independent Volume Control of Amplified Chat and Game Audio" [online], Aug. 22, 2007 [retrieved on Apr. 8, 2010], 2 pp., Retrieved From the Internet: http://www.turtlebeach.com/releases/20070822/Turtle-Beach-Annou . . . .

Block, Gerry, "Turtle Beach X2 Wireless Headset Review," May 3, 2006, IGN, http://www.ign.com/articles/2006/05/04/turtle-beach-x2-wireless-headset-review.

* cited by examiner

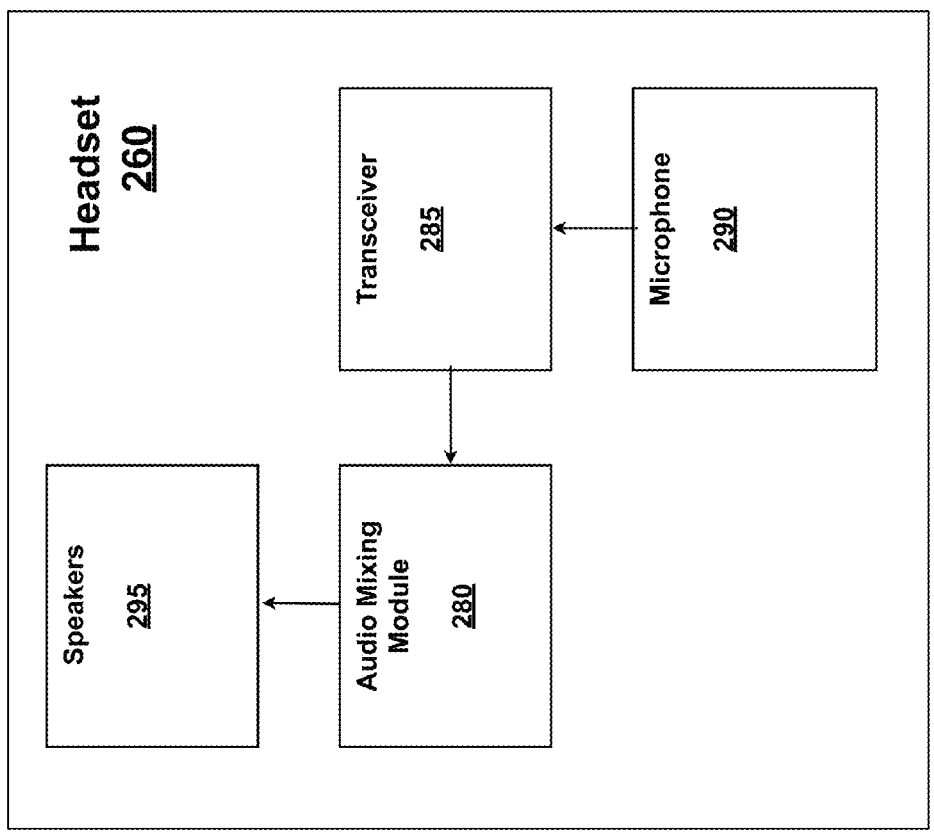

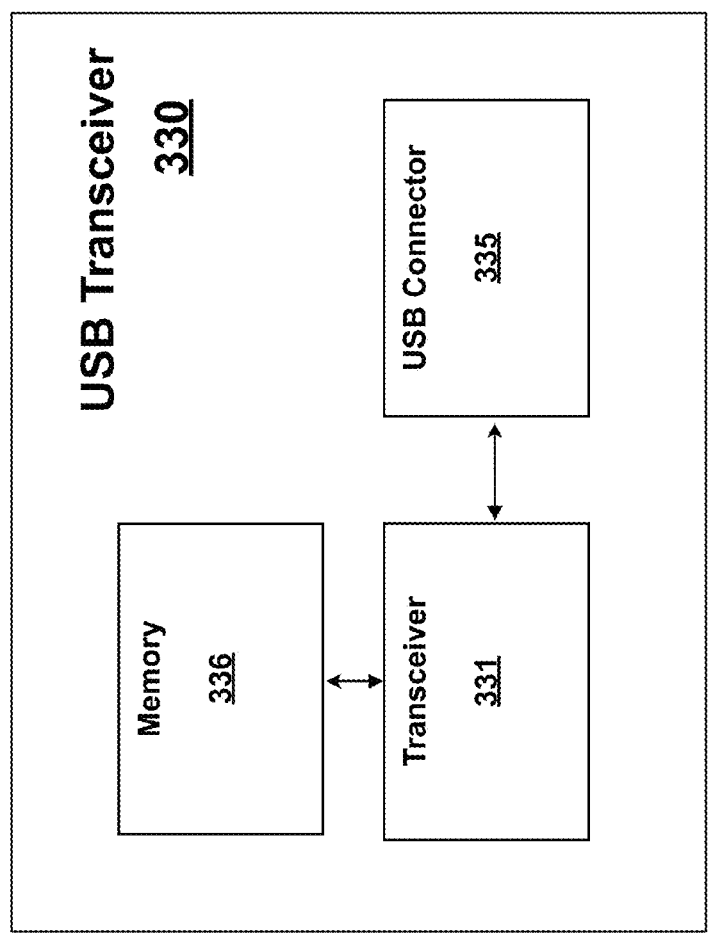

PC TRANSCEIVER AND METHOD OF USING THE SAME

FIELD OF THE INVENTION

The invention relates generally to multiple audio channel transmission and reception for PC-based gaming devices. More particularly, the invention relates to systems and methods for providing a user of a single gaming device a wireless connection to send one audio signal and to receive multiple audio signals from a PC transceiver in communication with the gaming device.

BACKGROUND

Evolution of gaming has created the need for more advanced audio and communication solutions. During game play, a user wants a better audio experience without the need to be physically tethered to a gaming device. Moreover, serious gamers require the ability to converse with other gamers at remote locations and listen to game audio simultaneously through the use of a headset.

Typically, a gamer wishing to participate in such conversation while gaming has only a few options. First, a gamer may allow game audio to play through an external speaker, such as a television or stereo system, while a headset is used to converse with networked players. This option, however, is not practical if a gamer wants to play a game without disturbing those around him or wants to utilize headsets to listen to game audio in, for example, surround sound. Moreover, this option is not ideal for serious gamers, as it is difficult or distracting for the gamer to control the volume of the external speaker and the volume of the headset, as two controllers or other adjustment means are necessary.

One solution to the above problems is described in U.S. patent application Ser. No. 12/047,260, now U.S. Pat. No. 8,571,695, issued Oct. 29, 2013, titled "Daisy-Chained Game Audio Exchange," incorporated by reference in its entirety herein. This application discloses a daisy-chainable game exchange, which allows a gamer to utilize his own headset to play games in surround sound. The user may physically plug the daisy-chainable game exchange into a number of audio sources including a gaming device and either an XBOX 360® controller producing a network chat stream from the XBOX LIVE® Network or another daisy-chainable game exchange to receive a local-area network chat stream. Unfortunately, the user's range of motion is restricted, as the daisy-chainable game exchange must be plugged into the gaming device.

Another solution to the above problem is described in U.S. patent application Ser. No. 12/958,462, now U.S. Pat. No. 8,491,386, issued Jul. 23, 2013, titled "SYSTEMS AND METHODS FOR REMOTELY MIXING MULTIPLE AUDIO SIGNALS," incorporated by reference in its entirety herein. This application discloses a system that allows a gamer to utilize a wired headset to receive game audio and network chat audio streams semi-wirelessly. The system includes a base station in physical communication with a gaming device and in wireless communication with a portable audio mixer, which in turn is placed in communication with a headset of a user via a wired cable. In "XBOX mode," network chat is transmitted from the gaming device to a gaming device controller, which is placed in wired communication with the portable audio mixer. Game audio is transmitted via a wired connection from the gaming device to the base station and then to the portable audio mixer. In "PS3 mode," both network chat and game audio are transmitted from the gaming device to the base station, which transmits the audio streams to a portable audio mixer. The disclosed base station is shown to employ separate, wired connections for each audio stream received from the gaming device and requires an external adapter to convert network chat to a useable format.

In contrast to gaming using a dedicated gaming console (e.g., Microsoft XBOX®, Sony PS3®, or Nintendo Wii®), in "PC gaming," where a general use personal computing device, e.g., a laptop, desktop, tablet computer, etc. (collectively "PC") is utilized to play video games, the network chat is typically transmitted through and controlled by a communication program that is separate from and unrelated to the video game software/program. Examples of such communication programs include Skype and other Voice Over Internet Protocol systems (VOIP), which allow players networked together through the Internet or a closed network (e.g., a wide area network (WAN), or a local area network (LAN)) to communicate. Thus, when a user plays a video game on a PC, the video game software outputs the video game audio stream including music, sound effects, and the like associated with the game itself, and the communication program outputs the network chat audio stream (e.g., from a teammate or opponent using the same communication program). The PC then combines the video game audio stream and the network chat audio stream in the form output by the video game software and communication program, respectively, into a single output audio stream that can then be transmitted to a headset or loudspeaker. In order to adjust the balance in the output stream between the game audio stream as compared with the network chat audio stream, the user must manually adjust the audio output settings (e.g., volume, tone, etc.) of the video game software or the communication program. Because the output signal is a single combined signal comprising both the game audio and the network chat audio streams, the balance between the game audio and network chat audio streams cannot be adjusted by the receiving device, such as a wireless headset or loudspeaker.

SUMMARY OF THE INVENTION

Exemplary embodiments described herein overcome the drawbacks of conventional wired and wireless gaming audio options. Methods and systems of the present invention allow a gamer to utilize a wireless headset to receive separate game audio and network chat audio streams wirelessly from a PC transceiver only requiring a single connection with a port of a PC-based gaming device. The PC transceiver may also receive local user chat from the headset and transmit the same to the gaming device—without the need for additional connections to the gaming device. Moreover, the present invention may allow a gamer to adjust the volume and balance of one or more audio streams received at a headset through the use of one or more controls.

In one aspect of the invention, an exemplary system is provided including a gaming device having a port and adapted to transmit separate game audio and network chat signals to a PC transceiver inserted into the port thereof, and receive local user chat through the PC transceiver inserted into the port. The system may also include a PC transceiver inserted into the port of the gaming device, the PC transceiver adapted to receive the game audio and the network chat transmitted from the gaming device, transmit the received game audio and network chat to a wireless headset, receive local user chat from the wireless headset, and transmit the received local user chat to the gaming device.

The system may also include at least one wireless headset wirelessly connected to the PC transceiver, the headset including a microphone and being adapted to receive the game audio and network chat from the PC transceiver, receive local user chat from the microphone, and transmit the local user chat wirelessly to the PC transceiver.

In another aspect of the invention, the PC transceiver may be adapted to receive game audio and network chat from a gaming device; wirelessly transmit the received game audio and network chat to a headset; wirelessly receive local user chat from the headset; and transmit the local user chat to the gaming device.

BRIEF DESCRIPTION OF THE DRAWINGS

The preferred embodiments of the present invention are illustrated by way of example and not limited to the following figures:

FIG. 2 shows a schematic diagram of an exemplary headset comprising an audio mixing module integral thereto.

FIG. 3 shows a schematic diagram of a PC transceiver according to an exemplary embodiment.

DETAILED DESCRIPTION

Figure 1:
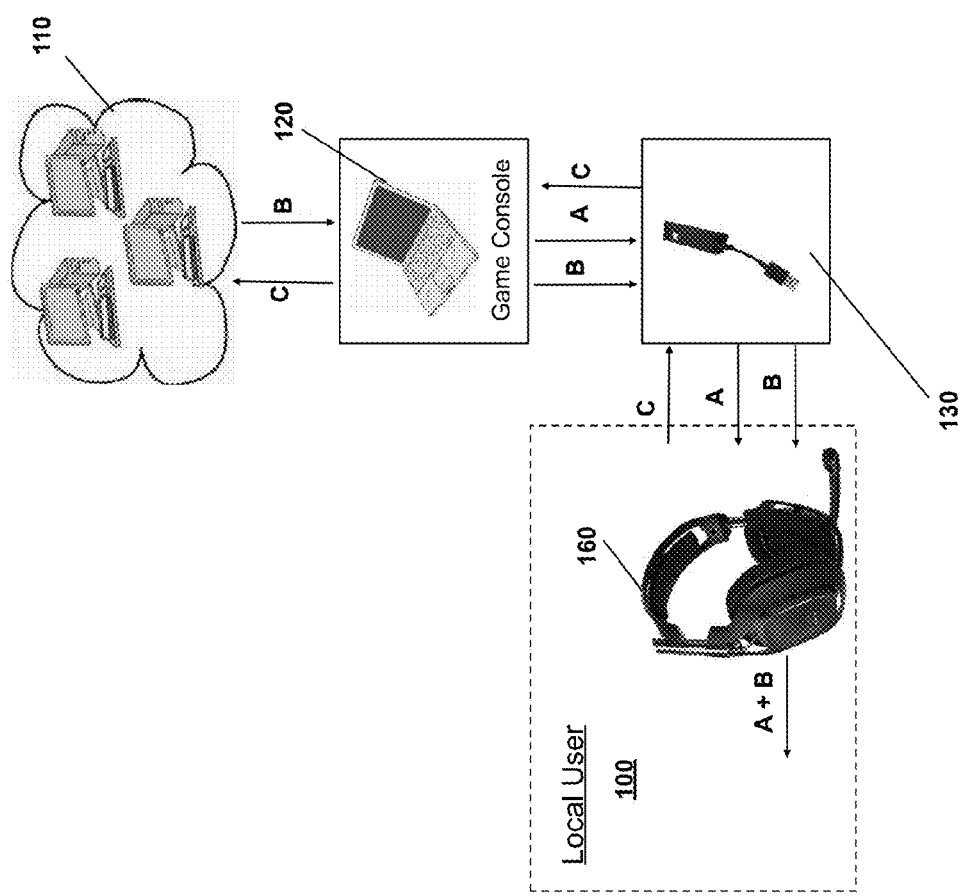
FIG. 1 shows a system architecture according to an exemplary embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided.

The term "gaming device" refers to any non-gaming specific general purpose computer, e.g., a desktop personal computer, laptop, tablet computer, and the like. A gaming device may comprise processors, memory, circuitry, input/output devices, audio-input jacks, audio-output jacks, video-input jacks, video-output jacks, and/or displays. A gaming device may comprise any number of connectors such as USB ports, and will contain one or more host controllers (i.e., logic to provide host functionality) and root hub function for connection of an external USB device to these ports. Each USB port may connect to a dedicated downstream port of a root hub in the gaming device, and each root hub connects to the host controller responsible for scheduling and controlling the transactions on the root hub ports. It will be appreciated that a gaming device may have one host controller servicing all ports or may comprise multiple host controllers. The root hub of a game controller typically includes a single upstream port for connection to a USB host, but may comprise a number of downstream ports for connection of peripherals.

A number of exemplary gaming devices will not comprise a display, but will rather comprise video-output jacks such that they may be electrically connected to a television or other external displays.

In many embodiments, the gaming device may be controlled by various input devices such a gaming device controller, a keyboard, a track-pad, a mouse, and buttons.

As used herein, the term "game audio" will refer to an audio stream or signal transmitted from a gaming device. The game audio may represent the audio a user hears when playing a game or other multimedia content on a gaming device. As an example, game audio may include such sounds as background music, sound effects, character dialogue, explosions and others sounds encountered during game or media play.

The term "local user chat" will refer to an audio stream or signal received from a local user (e.g. gamer) of a gaming device. Exemplary local user chat includes, but is not limited to, the audio stream produced by a gamer talking through a microphone of a headset.

The term "network chat" will refer to an audio stream or signal received by a local gaming device over a network. The network chat may comprise one or more audio streams from at least one networked user's microphone. Exemplary network chat is the audio stream or signal received from a communication program that allows networked chatting/communication between users of the same program such as SKYPE® and GOOGLE VOICE™ communication services. Another example of network chat may be the audio stream received over a local area network (LAN) and originating at a networked user's headset.

Embodiments of the present invention allow a local user of a gaming device to listen to both game audio and network chat and adjust the volume or tonal balance between the game audio and network chat through a wireless headset, and to transmit local user chat through the headset, without being tethered to the gaming device. In this way, a user may listen as loudly as he would like during a gaming session without disturbing others and customize his/her audio experience. The present invention further allows each user to enjoy these features without sacrificing audio quality.

As discussed in detail below, a transmitter module, such as a Universal Serial Bus also referred to as a USB receiver ("PC transceiver") may be connected to a port of a gaming device, e.g., a USB port, such that both a separate game audio and network chat may be received thereby. The PC transceiver may comprise a connector, such as a USB connector, which may be placed in electrical communication with a corresponding USB port of the gaming device. The PC transceiver may be wirelessly connected to a remote transceiver/receiver module of a headset such that game audio and network chat may be transmitted thereto. Moreover, as described in detail below, the PC transceiver may be adapted to receive local user chat from the headset.

In one embodiment, the game audio and network chat streams may be received by a headset comprising an audio mixing module. The audio mixing module may be adapted to receive local user chat from a microphone of the headset such that the local user chat may be transmitted to a gaming device. The audio mixing module may selectively combine, mix, or blend the separate game audio and network chat streams according to user input and preferences, such that a desired blended audio output stream may be output through the speakers of the headset. The audio mixing module may allow a user to control the tonal or volumetric/loudness balance between the game audio and network chat streams received from the PC transceiver and/or a local chat received from the microphone. The audio mixing module may also allow a user to control the overall volume of the blended audio output stream and therefore the volume output by the speakers of the headset. In this way, gamers may better focus on the social networking aspect of gaming by increasing the degree of network chat received or the user may refocus on game play by increasing the degree of game audio received, all without losing either stream.

Although described as being integral to a headset, it will be appreciated that an audio mixing module may alternatively be external to a wireless or wired headset. In one embodiment, the audio mixing module may be connected to a wireless headset via wireless protocol, such as, but not limited to, wireless USB, BLUETOOTH® or WI-FI®. In another embodiment, the audio mixing module may be connected to a wired headset via a cable that connects to, for example, an audio-out port of the mixing module.

Referring to FIG. 1, an exemplary system is shown wherein a gamer 100 may listen to both game audio A and network chat B from a gaming device 120 using a headset 160, without the need for the headset to be connected directly to the gaming device 120. Further, the depicted system allows the gamer 100 to socially interact with other gamers over a network 110 by using a microphone of the headset 160 such that local user chat C will propagate through the system to the gaming device 120 and then to other networked users' gaming devices.

A gaming device 120 may be connected to a network 110 by any means known in the art, such as through a physical connection (e.g., Ethernet) or through a wireless connection. In this particular embodiment, the user 100 is playing a game on a personal computer 120 gaming device, which is connected to multiple other consoles through the Internet 110. In order to operate the gaming device 120, the gamer 100 may utilize a gaming device controller, which is connected to the gaming device via either a wired or wireless connection.

Receiving the Game Audio and Network Chat

The gaming device 120 may be electrically connected to the PC transceiver 130 via a port of the gaming device 120. As described in further detail below, in the embodiment shown, the PC transceiver 130 may receive game audio A from a communication program running on the gaming device 120 to wirelessly transmit to a user 100.

In the pictured embodiment, the user 100 is in possession of the headset 160 comprising an audio mixing module integral thereto, and the headset 160 is wirelessly connected to the PC transceiver 130. It will be appreciated that the headset 160 and PC transceiver 130 may be wirelessly connected via any means known in the art.

In one particular embodiment, the headset 160 may be connected or "paired" to the PC transceiver 130 over a 5.8 GHz spectrum, which is relatively free from interference from other devices, such as 2.4 GHz wireless products, microwaves, and Bluetooth®. In one embodiment, dead zones and performance lag may be reduced by utilizing the 5.8 GHz spectrum as compared to other wireless network standards, and the systems described herein are thought to be capable of transmission of up to about 150 feet. Nevertheless, it will be appreciated that any number of wireless spectrums are thought to be compatible in connecting the PC transceiver 130 to the audio mixing module of the headset 160.

Although shown as integral to a headset, it will be appreciated that an audio mixing module may be external to a headset. In such an embodiment, a headset may be connected by each user to their respective audio mixing modules via, for example, a cable with a standard 3.5 mm plug. Moreover, the audio mixing module may be locally mounted on the user's person via a clip or other temporary fastening means. In an alternative embodiment, the audio mixing module may be detachably fastened to a gaming device controller.

As shown, game audio A may originate from a video game software/program running on the gaming device 120 when a user 100 launches the video game program. Once produced by the video game, the game audio A may be transmitted by the gaming device 120 to the PC transceiver 130. As described above, the PC transceiver 130 may then transmit the game audio A to a user's headset 160.

Certain embodiments provide that, if the gaming device 120 is connected to a network 110, network chat B may be received by the gaming device 120 from the network 110. In the particular embodiment shown, the network chat B may be received by the gaming device 120 through the communication program running thereon, and transmitted to the PC transceiver 130. The PC transceiver 130 may then transmit the network chat B wirelessly to the headset 160. Both the game audio A and the network chat B are transmitted as separate, distinct signals from the PC transceiver 130 to the headset 160, which may or may not be transmitted simultaneously.

The PC transceiver 130 may be operable to convert audio streams/signals from analog-to-digital (A/D) or from digital-to-analog (D/A) such that a digital audio signal from a gaming device 120, such as network chat B may be converted to an analog signal before being turned back into digital then transmitted to a headset's audio mixing module and/or an analog signal received by the PC transceiver 130, such as local user chat C, which may be converted to a digital signal before being transmitted to the gaming device 120. It will be appreciated that a conversion of a signal such as network chat B from digital-to-analog may or may not be necessary depending on the gaming device and on the wireless connection between the PC transceiver and the headset.

Once the game audio A and/or the network chat B are transmitted by the PC transceiver 130 to the headset 160, the two streams/signals may be mixed together by the audio mixing module 280 (FIG. 2), which is physically separate from the gaming device 120 and unrelated to the video game software or the communication program. The mixing module 280 then transmits a single, blended audio output stream A+B (discussed in detail below) to the headset 160. It will be appreciated that the game audio A and network chat B may be sent and received by individual components of the exemplary system both independently of each other and/or simultaneously.

Sending Local User Chat

In certain embodiments, a user's headset 160 may comprise a microphone such that the user 100 may socially interact with other gamers over a network 110. Embodiments of the present invention may allow a local user 100 to socially interact with networked users simultaneously and/or independently.

For example, the user 100 may talk into a microphone to produce local user chat C. Local user chat C may be transmitted from the user's headset 160 to the PC transceiver 130. Upon receiving the local user chat C, the PC transceiver 130 may transmit the stream to the gaming device 120. Finally, the gaming device 120 may transmit the local user chat C over the network 110 through the communication program, where it may be incorporated into the network chat B stream and sent to all networked users.

Headset with Audio Mixing Module

Referring to FIG. 2, a schematic diagram of an exemplary headset 260 comprising an audio mixing module 280 integral thereto is illustrated. It will be appreciated that sections of representative circuits are described in commonly owned U.S. patent application Ser. No. 12/047,160, now U.S. Pat. No. 8,571,695, issued Oct. 29, 2013, titled "Daisy-Chained Game Audio Exchange," and U.S. patent application Ser. No. 12/958,462, now U.S. Pat. No. 8,491,386, issued Jul. 23, 2013,titled "SYSTEMS AND METHODS FOR REMOTELY MIXING MULTIPLE AUDIO SIGNALS," which are both incorporated by reference in entirety herein.

An exemplary headset 260 may comprise a pairing/power control (not shown), which may be toggled by a user to power the headset 260 and audio mixing module 280 on and off. The pairing/power control may be electrically connected to an LED or similar circuitry such that the power status of the headset 260 may be indicated to a user. For example, the pairing/power control may illuminate when the headset is turned on, flash a first color when the battery power is low, display a second color when the battery is charging, and/or darken when the headset is turned off. In certain embodiments, a user may check the amount of battery power left in a battery by quickly pressing the pairing/power control.

In some embodiments, the headset 260 may automatically connect or "pair" to a PC transceiver (e.g., FIG. 1 at 130) when powered on. In other embodiments, a user may press the pairing/power control for a period of time in order to set the headset 260 into discovery mode. Once in discovery mode, the headset may be paired to the PC transceiver 130 of FIG. 1, which is also in discovery mode. The pairing/power control may also be electrically connected to an LED or similar circuitry such that pairing status of the audio mixing module may be indicated to a user. In one embodiment, a user may hold the pairing/power control for an amount of time, and the LED may begin to blink to indicate that the headset is in discovery mode. Once the headset is paired to a PC transceiver, an LED of a pairing/power control may remain illuminated. To unpair the headset from the PC transceiver, the user may hold down the pairing/power control again. Although discussed as a single control, in one embodiment, the pairing/power control may be two separate controls; one control may control power and one control may control pairing.

Often, gamers may gather together in a single room with multiple gaming devices to play a single game, or may link multiple-consoles together in, for example, a LAN to play the same game. The present system allows for both of these scenarios, as a headset 260 paired with a PC transceiver 130 will not interfere with a second headset paired to a different gaming device and different PC transceiver. This feature prevents interference even if the gaming devices are operated in a small space, such as a single room. In fact, it is contemplated that 2, 4, 6, 8, 10, 12, 14, and even 16 gaming devices may each be connected to different PC transceivers and operated in the same room without experiencing any audio interference problems.

Exemplary headsets may be powered by any means known in the art, including but not limited to, disposable and/or rechargeable batteries. For example, 1, 2, 3 or 4 AAA alkaline batteries or a rechargeable battery, such as a lithium ion battery may be employed within a housing of the headset. In the case of the lithium ion battery, such a battery may be charged without removing the battery from the audio mixing module unit by inductive charging or by connecting a wire to a power jack of the headset and an external power source, such as a wall-mounted USB charger via a USB cable. In certain embodiments, such a battery may be charged by plugging one end of a USB cable into the power jack and the other end of the cable into a user's computer.

The audio mixing module 280 may comprise a number of adjustment means, such as but not limited to, controls, slides, knobs and/or buttons (either physically depressible buttons or capacitive buttons) may be accessible to a user of the headset 260 to allow a user to adjust properties of a blended audio output stream that may be transmitted from an audio mixing module to a headset of the user (discussed below). Exemplary properties include, but are not limited to, tonal or loudness balance between the separate game audio and network chat received from the PC transceiver 130, volume of the blended game audio and network chat output stream, or volume of the individual game audio or network chat. Therefore, in certain embodiments, a user may activate the balance control to specify how much of the audio information coming from network chat or game audio streams should be represented to the user's headset. In certain embodiments, it is possible to turn either the game audio or network chat to any volume levels up to and including 0% to 100% for either source.

In one embodiment, the headset 260 may comprise a bass boost control, which may control a bass boost feature. By activating the bass boost control, a user may activate a bass boost feature of the headset, wherein low-end frequencies of the incoming signal may be increased before being transmitted to the user. The bass boost control may also be connected to an LED or similar circuitry, such that the control may be illuminated when the bass boost feature is turned on.

An exemplary path of game audio and network chat signals/streams through the audio mixing module 280 of the headset 260 will now be described. Initially, game audio is produced by a video game program/software running on the game device 120 of FIG. 1, and network chat is produced by the communication program running on the game device 120. The game audio and network chat are transmitted to the PC transceiver 130 (FIG. 1), which then transmits the game audio and the network chat wirelessly as separate signals to the transceiver 285 in the headset 260. The transceiver 285 then passes the separate game audio and network chat signals to the audio mixing module 280 for either transmission or processing, according to user inputs as described above. The transceiver 285 of the headset 260 may be capable of both receiving and transmitting audio signals (digital or analog) at any frequency known in the art, but should be compatible with the PC transceiver 130. In one embodiment, the wireless transceiver 285 preferably operates at spectrum of about 5.8 GHz.

In some embodiments, network chat and/or game audio may be received in a digital form from the PC transceiver 130 of FIG. 1 by the wireless transceiver 285 of the headset 260. The network chat and/or game audio may be processed by volume circuitry, such as a gain circuit at audio mixing module 280 such that it may be amplified. The amplified signals may then be processed by mixing or balance circuitry, such as a potentiometer, or equalizer circuitry that allows the signal to be adjusted tonally according to the user's preference. The mixing module 280 generates a blended audio signal incorporating any modifications to the game audio and network chat signals received from the transceiver 285, and the blended audio signal is then sent to the speakers 295, which reproduce the signals as audible sound to the user.

The user may adjust the balance between both the network chat and game audio streams, along with the volume of the blended audio output stream. For example, the user may adjust the balance such that only network chat is audible, only game audio is audible, or such that any combination of network chat and game audio is audible. The blended audio output stream may be output to a user's speakers 295 as-is or may be amplified first.

In one exemplary embodiment, a microphone 290 of the headset 260 may be adapted to receive local user chat from a user such that the user may converse with remote, networked gamers. As discussed above, the headset 260 may transmit the received local user chat to a gaming device via a transceiver 285 in connection with a PC transceiver 130 of FIG. 1.

Local user chat may be received from a microphone 290 of the user's headset 260 and sent to the PC transceiver 130. The local user chat may travel through a low voltage microphone processor, which may provide noise gating and automatic level control to provide a cleaner, noise-free voice chat stream. The local user chat may be encoded by, for example, a CODEC and the encoded local user chat may be transmitted wirelessly to the PC transceiver 130 via the transceiver 285.

PC Transceiver

Referring to FIG. 3, a schematic diagram of a PC transceiver 330 according to an exemplary embodiment is illustrated. As shown, a PC transceiver 330 may comprise a USB connector 335 in electrical communication with a transceiver 331 and memory 336. A body of the PC transceiver 330 may comprise a plastic or metal housing in communication with the USB connector 335, and the housing may have any number of buttons, status indicators, graphics and the like thereon. The housing may have the transceiver 331, memory 336, and associated circuitry housed therein.

The PC transceiver 330 may comprise a USB 1.0, 2.0 or 3.0, Standard or Powered Type-A, Type-B, Micro-A, Micro-AB, or Micro-B connector 335. Preferably, the PC transceiver 330 will comprise a USB 3.0 Type-A connector 335, which may be placed in electrical communication with a corresponding USB port of the gaming device via, for example, insertion of the connector into the port.

The USB specification provides for a cable bus supporting data exchange between a host gaming device and a wide range of simultaneously accessible peripherals, such as, but not limited to, a PC transceiver. The attached peripherals may share bandwidth through a host-scheduled protocol. The bus allows the PC transceiver 330 to be attached, configured, used, and detached while the host and other peripherals are in operation.

In certain embodiments, the PC transceiver 330 may be automatically detected and installed when connected to a gaming device via a USB port. Such "enumeration" involves communicating with the PC transceiver 330 (i.e., with software loaded into the memory 336) to discover the identity of a device driver that the gaming device should load, if not already loaded. During enumeration, the PC transceiver 330 may identify itself to the gaming device and inform the gaming device of its capabilities, specifically, the ability to act as a receiver of two separate audio output signals, such as the game audio and the network chat.

A unique address may be assigned to the PC transceiver 330 to be used for run-time data transfers. For example, a vendor ID, product ID, and/or serial number of the PC transceiver 330 may be used to form an identifier used by the host operating system of the gaming device to uniquely identify the device. If the device is supported by the gaming device, the device drivers needed for communicating with the device are loaded and the device is set to a configured state. If the gaming device is restarted, the enumeration process is repeated for all connected devices.

The PC transceiver 330 may present itself to a gaming device as a number of sub-devices ("functions"), such as, but not limited to, a first audio output device function, a second audio output device function, and an audio input device function. In one example, the first audio device function may be configured to receive game audio from a connected gaming device; the second audio output device function may be configured to receive network chat from a connected gaming device; and the audio input device function may be configured to transmit local user chat to the gaming device. Accordingly, the PC transceiver 330 may be referred to as a "composite device."

Each device function of the PC transceiver 330 may be defined by a particular class code, and each class code may be communicated to the gaming device during enumeration. The class codes may affect the loading of corresponding software driver modules such that the appropriate audio stream is input or output to the gaming device. A class-interface descriptor and associated functional descriptor embedded within the PC transceiver's 330 normal run-time descriptors may serve this purpose and provide a target for class-specific requests over a control pipe.

In one embodiment, the PC transceiver 330 may include one device function described by an input terminal type descriptor, which is generally used to describe terminals that are designed to record sounds. The PC transceiver 330 may also include two device functions described by an output terminal type descriptor, which are generally used to describe terminals that produce audible signals that are intended to be heard by a user of an audio function. In other embodiments, the PC transceiver 330 may include a plurality of device functions having bi-directional terminal type descriptors. One or more descriptors may be used separately for input only or output only, however these types of descriptors typically require multiple endpoints to have the same bi-directional descriptor. Moreover, the plurality of endpoints may be linked together in their respective endpoint descriptors.

In certain embodiments, the gaming device system software may detect the PC transceiver 330 and indicate a status to the user. For example, the user may be notified that the PC transceiver 330 is supported and/or that appropriate software has been installed. Generally, a prompt may be displayed to a user asking the user to select the appropriate device for (1) output of network chat; (2) output of game audio; and (3) input of local user chat. In certain embodiments, the gaming device may automatically assign the appropriate audio stream to the corresponding function of the PC transceiver 330 during enumeration.

Once the PC transceiver 330 is properly enumerated, the host gaming device 120 of FIG. 1 may initiate transactions to specific device functions, and each function accepts its transactions and responds accordingly. When attached to a gaming device (master), the PC transceiver 330 operates as a slave that obeys a defined protocol. The PC transceiver 330 obeys request transactions sent from the host gaming device 120 and responds to control transactions that, for example, request detailed information about the device and its configuration. Generally, the PC transceiver 330 sends and receives data to/from the host using a standard USB data format.

In certain embodiments, the PC transceiver 330 may comprise a Dolby on/off control, which may be activated to instruct the PC transceiver 330 to format and transmit game audio in DOLBY® Headphone Surround Sound, DOLBY®

Digital 7.1, DOLBY® Digital 5.1 and/or DolbyPRO LOGIC® II formats. When the Dolby on/off control is activated, the PC transceiver 330 may turn on this feature and begin transmitting audio in a compatible Dolby® format. When the Dolby on/off control is toggled off, the PC transceiver 330 may stop transmitting audio in Dolby® format, such that the PC transceiver 330 operates in a 2-channel stereo mode, where no Dolby® processing is applied to the incoming audio signal. It will be appreciated that certain Dolby® formats require the input audio stream to have certain formatting upon entering the PC transceiver 330, and streams lacking these required features may not be transmitted in a particular Dolby® format. Additional game audio processing features of the PC transceiver 330 are discussed below.

In one embodiment, the PC transceiver 330 automatically detects any headsets and/or audio mixing modules that are in discovery mode and establishes a connection thereto. However, in other embodiments, the PC transceiver 330 may comprise a separate pairing control. The user may set the PC transceiver 330 into discovery mode such that the PC transceiver 330 may be paired to a headset and/or audio mixing module.

In one embodiment, the PC transceiver 330 does not include a power port, and the PC transceiver 330 may receive power via a USB port of a gaming device.

An exemplary path of a game audio stream through an embodiment of a PC transceiver 330 is now provided. The game audio stream may enter into the PC transceiver 330 through a USB connector. The game audio stream may travel through a digital signal processor capable of processing the game audio stream into any number of formats including, but not limited, to DOLBY® Headphone Surround Sound, DOLBY® Digital 7.1, DOLBY® Digital 5.1 and/or DolbyPRO LOGIC® II formats. The digital signal processor may format the game audio using various equalization algorithms, compression, signal generation, tone control, fade/balance, level meter/spectrum analysis, matrix decoding and/or sound processing algorithms. The re-formatted game audio stream may be output from the digital signal processor and transmitted to, for example, a wireless transceiver 331. The wireless transceiver 331 may send the received compatibly formatted game audio signals to an audio mixing module 280 of the headset 260 of FIG. 2. The wireless transceiver 331 may be a 5.8 GHz wireless module.

The PC transceiver 330 may also be capable of receiving and transmitting network chat to a headset 260 (FIG. 2) and/or audio mixing module that is separate from the headset 260. The network chat may be received through the same connection (e.g., USB connector) of the gaming device 120 (FIG. 1) that received the game audio stream. The network chat may be processed as necessary, and sent to a wireless transceiver module 331 of the PC transceiver 330. Once received by the wireless transceiver 331, the network chat may be transmitted wirelessly to the headset 260 and/or audio mixing module.

In certain embodiments, the PC transceiver 330 may be capable of receiving local user chat from the microphone 290 of the headset 260 (FIG. 2) such that the local user chat may be transmitted to the gaming device 120 (FIG. 1) and then over a network to networked gamers. Local user chat may be received by the PC transceiver 330 via the transceiver 331. The local user chat may be received by a wireless transmitter/receiver of the PC transceiver 330.

In some embodiments, local user chat may be received by the PC transceiver 330 in analog form. The local user chat may be converted by, for example, an audio CODEC into a digital form and sent through the connector to the gaming device. It will be appreciated that the network chat and local user chat may be simultaneously transmitted and received by the gaming device and the PC transceiver 330. Moreover, it will be appreciated that network chat may be converted from a digital-to-analog form and the local user chat from an analog-to-digital form. In certain embodiments, the PC transceiver 330 adapter may contain such circuitry as to perform programmable gain, pre-amplification, bass boost, data storage, noise suppression and the like.

In other embodiments, the PC transceiver 330 may receive local user chat and/or network chat in digital form. Accordingly, the PC transceiver 330 may not need to convert such signals from analog to digital.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

We claim:

1. A system for transmitting a game audio stream and network chat audio stream from a gaming device to a headset and for receiving a local user chat audio stream from the headset, the system comprising:
  a gaming device;
  a composite USB transceiver configured to be repeatedly removably connected to the gaming device, the composite USB transceiver adapted to:
    communicate with the gaming device when connected to a port of the gaming device, the communication includes an enumeration process wherein the composite USB transceiver presents itself to the gaming device in the form of multiple functions, each of the multiple functions being defined by a particular class code and associated descriptor and the gaming device discovering an identity of at least one device driver for implementing one or more of the multiple functions of the composite USB transceiver using the corresponding class code and associated descriptor communicated from the composite USB transceiver and loading the at least one device driver on the gaming device;
    automatically detect a wireless headset in discovery mode for establishing wireless communication therewith;
    receive a first audio signal comprising game audio from the gaming device;
    receive a second audio signal comprising network chat from the gaming device, the second audio signal being discrete and separate from the first audio signal;
    wirelessly transmit the first and second audio signals to the wireless headset;
    receive a third audio signal comprising local user chat from the wireless headset; and
    transmit the third audio signal to the gaming device; and
  the wireless headset comprising a microphone and being adapted to:
    receive the first and second audio signals from the composite USB transceiver;

receive the third audio signal from the microphone; and transmit the third audio signal wirelessly to the composite USB transceiver.

2. The system of claim 1, wherein the wireless headset further comprises an audio mixing module that selectively mixes the first and second audio signals to produce a blended audio output stream.

3. The system of claim 2, wherein the wireless headset further comprises adjustment means such that a user may adjust at least one of volume and balance of the first and second audio signals in the blended audio output stream.

4. The system of claim 3, wherein the balance of the blended audio output stream is adjusted to allow the user to hear only the first audio signal.

5. The system of claim 3, wherein the balance of the blended audio output stream is adjusted to allow the user to hear only the second audio signal.

6. The system of claim 3, wherein the balance of the blended audio output stream is adjusted to allow the user to hear any combination of the first and second audio signals.

7. The system of claim 1, wherein the gaming device is in communication with a network and the network chat is provided to the gaming device over the network.

8. The system of claim 1, wherein the game audio and network chat are transmitted independently.

9. The system of claim 1, wherein the game audio and network chat are transmitted simultaneously.

10. A composite USB transceiver configured to be repeatedly removably connected to a gaming device, the composite USB transceiver adapted to:
communicate with the gaming device when connected to a port of the gaming device, the communication includes an enumeration process wherein the composite USB transceiver presents itself to the gaming device in the form of multiple functions, each of the multiple functions being defined by a particular class code and associated descriptor and the gaming device discovering an identity of at least one device driver for implementing one or more of the multiple functions of the composite USB transceiver using a corresponding class code and associated descriptor communicated from the composite USB transceiver and loading the at least one device driver on the gaming device;
automatically detect a wireless headset in discovery mode for establishing wireless communication therewith;
receive a first audio signal comprising game audio from the gaming device;
receive a second audio signal comprising network chat from the gaming device, the second audio signal being discrete and separate from the first audio signal;
wirelessly transmit the first and second audio signals to the wireless headset;
receive a third audio signal comprising local user chat from the wireless headset; and
transmit the third audio signal to the gaming device.

11. The composite USB transceiver of claim 10, wherein the gaming device is in communication with a network and the second audio signal is provided to the gaming device over the network.

12. The composite USB transceiver of claim 10, wherein the composite USB transceiver is in wireless communication with the wireless headset.

13. The composite USB transceiver of claim 10, wherein the wireless headset further comprises an audio mixing module that mixes the first audio signal and the second audio signal to produce a blended audio output stream.

14. The composite USB transceiver of claim 10, wherein the first audio signal and the second audio signal are transmitted to the wireless headset independently.

15. The composite USB transceiver of claim 10, wherein the first audio signal and the second audio signal are transmitted to the wireless headset simultaneously.

16. The composite USB transceiver of claim 11, wherein the wireless headset further comprises adjustment means such that a user may adjust at least one of volume and balance of the first audio signal and the second audio signal in a blended audio output stream.

17. The composite USB transceiver of claim 10, further adapted to present itself to the gaming device as a first audio output device function, a second audio output device function, and a first audio input device function.

18. The composite USB transceiver of claim 17, wherein the first audio output device function is configured to receive the first audio signal from the gaming device.

19. The composite USB transceiver of claim 17, wherein the second audio output device function is configured to receive the second audio signal from the gaming device.

20. The composite USB transceiver of claim 17, wherein the first audio input device function is configured to transmit the third audio signal to the gaming device.

* * * * *